United States Patent
Liu et al.

(10) Patent No.: US 12,319,263 B1
(45) Date of Patent: Jun. 3, 2025

(54) ADAPTIVE CONTROL METHOD AND SYSTEM BASED ON TRAIN OPERATING CONDITION IDENTIFICATION

(71) Applicant: CRSC Research & Design Institute Group Co., Ltd., Beijing (CN)

(72) Inventors: Ling Liu, Beijing (CN); Hui Yang, Beijing (CN); Hairong Dong, Beijing (CN); Junfeng Cui, Beijing (CN); Zhiqiang Chen, Beijing (CN); Bo Zhang, Beijing (CN); Gehui Liu, Beijing (CN); Hong'en Liu, Beijing (CN); Pengyu Bao, Beijing (CN)

(73) Assignee: CRSC Research & Design Institute Group Co., Ltd. (CN)

( * ) Notice: Subject to any disclaimer, the term of this patent is extended or adjusted under 35 U.S.C. 154(b) by 0 days.

(21) Appl. No.: 18/969,332

(22) Filed: Dec. 5, 2024

Related U.S. Application Data (63) Continuation-in-part of application No. PCT/CN2024/110874, filed on Aug. 9, 2024.

(30) Foreign Application Priority Data

Jul. 30, 2024 (CN) .......................... 202411028745.9

(51) Int. Cl.
 *B60W 10/04* (2006.01)
(52) U.S. Cl.
 CPC ......... *B60W 10/04* (2013.01); *B60W 2300/44* (2013.01); *B60W 2555/20* (2020.02)

(58) Field of Classification Search
 CPC ............ B60W 10/04; B60W 2300/44; B60W 2555/20
 See application file for complete search history.

(56) References Cited

U.S. PATENT DOCUMENTS

| | | | | |
|---|---|---|---|---|
| 9,296,401 | B1* | 3/2016 | Palmer | B61L 15/0072 |
| 2010/0241296 | A1* | 9/2010 | Rhea, Jr. | B61L 15/0062 |
| | | | | 701/20 |
| 2012/0072088 | A1* | 3/2012 | Cutright | B60T 13/665 |
| | | | | 701/70 |

(Continued)

*Primary Examiner* — Mussa A Shaawat

(57) ABSTRACT

Disclosed is an adaptive control method and system for train operating condition identification. The method includes acquiring train operating state data under various traction conditions and calculating traction and braking performance data. An adhesion condition characteristic data set is formed, and train adhesion conditions are divided into $N_z$ grades based on this data set, where $N_z$ is a natural number. The current adhesion condition grade $N_d$ is identified using the number of adhesion condition grades and current operating state data, where $N_d \leq N_z$, establishing a mapping relationship between an adhesion coefficient and maximum deceleration for braking under the identified grade. An optimal train protection curve is generated. By clustering and grading adhesion conditions through a clustering algorithm, the method achieves more accurate adhesion condition analysis. Adaptively generating optimal train protection curves based on adhesion condition grades enhances the reliability and safety of train operations.

20 Claims, 2 Drawing Sheets

(56) References Cited

U.S. PATENT DOCUMENTS

| | | | | |
|---|---|---|---|---|
| 2012/0269383 | A1* | 10/2012 | Bobbitt | G06V 20/54 |
| | | | | 382/103 |
| 2013/0018534 | A1* | 1/2013 | Hilleary | B61L 29/30 |
| | | | | 701/19 |
| 2013/0048795 | A1* | 2/2013 | Cross | B61L 15/0027 |
| | | | | 246/122 R |
| 2014/0339374 | A1* | 11/2014 | Mian | B61L 29/30 |
| | | | | 246/473.1 |
| 2015/0000415 | A1* | 1/2015 | Kelley | B61L 5/206 |
| | | | | 73/649 |
| 2015/0251561 | A1* | 9/2015 | Konigorski | B64F 1/0299 |
| | | | | 244/100 R |
| 2016/0114820 | A1* | 4/2016 | Palmer | B61L 15/0072 |
| | | | | 246/107 |
| 2019/0111951 | A1* | 4/2019 | Tione | B61L 15/0058 |
| 2021/0107538 | A1* | 4/2021 | Howard | G06N 5/01 |
| 2022/0180023 | A1* | 6/2022 | Yang | B61L 15/0062 |
| 2024/0336289 | A1* | 10/2024 | Li | B61L 15/0018 |

* cited by examiner

Acquiring operating state data of a train under different traction conditions by adopting a multi-sensor fused adhesion characteristic state self-calibration observer and calculating to obtain traction and braking performance data Combining the traction and braking performance data, line information data and operating control information to form a multi-sensor fused adhesion condition characteristic related data set Dividing, based on the adhesion condition characteristic related data set, train adhesion conditions into $N_z$ grades, where $N_z$ is a natural number Identifying a train current adhesion condition grade $N_d$ based on a number $N_z$ of train adhesion condition grades and current operating state data, where $N_d$ is a natural number, $N_d \leq N_z$ Inputting the train current adhesion condition grade $N_d$ and establishing a mapping relationship between an adhesion coefficient and a maximum deceleration for train braking under the current adhesion condition grade Generating a train protection curve based on the mapping relationship between the adhesion coefficient and the maximum deceleration for train braking under the current adhesion condition grade

ADAPTIVE CONTROL METHOD AND SYSTEM BASED ON TRAIN OPERATING CONDITION IDENTIFICATION

CROSS-REFERENCE TO RELATED APPLICATIONS

This application claims the priority of China patent application filed in China Patent Office on Jul. 30, 2024, with the application number of CN202411028745.9 and the application name of "An adaptive control method and system based on train operating condition identification", which is incorporated herein by reference in its entirety.

TECHNICAL FIELD

The present invention belongs to the technical field of rail transit, and in particular relates to an adaptive control method and system based on train operating condition identification.

BACKGROUND

Operating environments of trains include cold, rainy, snowy, wind-sand, hot and humid and other harsh and complicated conditions. Under these complex operating conditions, the adhesion coefficient between rails and wheels of the train will change significantly, which will directly affect a braking process of the train and then affect the operating safety of the train. Therefore, an accurate and reliable identification technology of an adhesion condition is an important support for safe and efficient tracking operation of high-speed trains. An adhesion working point (that is, a real-time adhesion coefficient) is a main reason for the change of the adhesion condition, and an optimal adhesion condition is at a junction of a stable region and an unstable region of adhesion characteristics, and changes with the change of wheel-rail operating conditions. On-line accurate identification of the adhesion condition is one of key technologies of automatic driving of high-speed trains, and the setting of operation optimization control input of automatic driving of the high-speed trains needs to be based on accurate and reliable identification of the adhesion condition. During the multi-train tracking operation of high-speed trains, a spacing distance of safe tracking is closely related to the wheel-rail adhesion condition. The accurate and reliable identification of the adhesion condition is an important guarantee to ensure the safety and efficiency of the close tracking operation of the high-speed trains.

In addition, an existing protection curve generation technology (such as European standard model Subset-026) mainly calculates the protection curve by manually setting the train deceleration value, where the train deceleration value mainly considers 5 factors, namely a train speed, a basic resistance deceleration, a deceleration mode and level, a track wet and dry state and a wind resistance, and a train braking force is statically selected according to values of the factors through a look-up table, and generally braking force data under wet track conditions is selected as the calculation basis of the protection curve according to the most unfavorable conditions. Further considering the influence of a gradient, the actual acceleration of the train is calculated, and an uphill is usually ignored when considering the most unfavorable conditions. In these processes, it is usually impossible to dynamically adjust the braking force and dynamically generate the protection curve according to the change of the adhesion conditions. When the output braking force of the train is large, unfavorable operation situations such as wheel locking are prone to occur, which leads to insufficient protection and even affects the operating safety of the train. On the other hand, the safety-oriented train protection usually sets more safety margins. For example, a reduction coefficient is usually added to the train deceleration selection for calculation, and the obtained protection curve is prone to the problem of over-protection, which even limits the operating efficiency of the train.

Therefore, how to dynamically generate the train protection curve according to the adhesion conditions to ensure the safety of train operation is an urgent problem to be solved in the field of rail transit technologies, train control systems and adhesion condition simulation technologies.

SUMMARY

In view of the above problems, the present invention provides an adaptive control method and system based on train operating condition identification, which has strong adaptability and high safety and reliability.

An object of the present invention is to provide an adaptive control method based on train operating condition identification, including:

acquiring operating state data of a train under different traction conditions by adopting a multi-sensor fused adhesion characteristic state self-calibration observer and calculating to obtain traction and braking performance data;

combining the traction and braking performance data, line information data and operating control information to form a multi-sensor fused adhesion condition characteristic related data set;

dividing, based on the adhesion condition characteristic related data set, train adhesion conditions into $N_z$ grades by adopting a fuzzy clustering-based false nearest neighbors algorithm, where $N_z$ is a natural number, and $$N_z \geq 2;$$

identifying a train current adhesion condition grade $N_d$ based on a number $N_z$ of train adhesion condition grades and current operating state data, where $N_d$ is a natural number, $$N_d \leq N_z,$$

and $$N_d \in N_z;$$

inputting the train current adhesion condition grade $N_d$ and establishing a mapping relationship between an adhesion coefficient and a maximum deceleration for train braking under the current adhesion condition grade; and generating a train protection curve based on the mapping relationship between the adhesion coefficient and the maximum deceleration for train braking under the current adhesion condition grade.

Another object of the present invention is to provide an adaptive control system based on train operating condition identification, including:

- a multi-sensor fused adhesion characteristic state self-calibration observer configured to acquire operating state data of a train under different traction conditions;
- a data calculation module configured to calculate to obtain traction and braking performance data based on the acquired operating state data of the train under different traction conditions;
- a data integration module configured to combine the traction and braking performance data, line information data and operating control information to form a multi-sensor fused adhesion condition characteristic related data set;
- a clustering module configured to divide, based on the adhesion condition characteristic related data set, train adhesion conditions into $N_z$ grades by adopting a fuzzy clustering-based false nearest neighbors algorithm, where $N_z$ is a natural number, and $$N_z \geq 2;$$

- an identification module configured to identify a train current adhesion condition grade $N_d$ based on a number $N_z$ of train adhesion condition grades and current operating state data, where $N_d$ is a natural number, $$N_d \leq N_z,$$

and $$N_d \in N_z;$$

- a mapping relationship establishing module configured to input the train current adhesion condition grade $N_d$ and establish a mapping relationship between an adhesion coefficient and a maximum deceleration for train braking under the current adhesion condition grade; and
- a curve generation module configured to generate a train protection curve based on the mapping relationship between the adhesion coefficient and the maximum deceleration for train braking under the current adhesion condition grade.

The adaptive control method of the present invention clusters and grades the adhesion conditions through the clustering algorithm, such that the analysis on the adhesion conditions in a train operating process is more accurate, the current adhesion condition grades are obtained based on cluster analysis, and the train protection curve is adaptively generated to protect the train operation, so that the control of the train is more reliable and the safety of the train operation is improved.

Other features and advantages of the present invention will be set forth in the description below, and in part will be apparent from the description, or may be learned by the practice of the present invention. The objects and other advantages of the present invention can be realized and obtained by structures pointed out in the description, claims and drawings.

BRIEF DESCRIPTION OF THE DRAWINGS

In order to more clearly illustrate the technical solutions in embodiments of the present invention or in the prior art, the accompanying drawings required to be used in the description of the embodiments or the prior art are introduced briefly as follows. Apparently, the accompanying drawings in the following description are some embodiments of the present invention, and it will be understood by those ordinarily skilled in the art that other drawings can be obtained according to the accompanying drawings without creative efforts.

DETAILED DESCRIPTION

In order to make the purposes, technical solutions and advantages of the embodiments of the present invention clearer, the technical solutions in the embodiments of the invention will be explained clearly and completely below in conjunction with accompanying drawings. Apparently, the embodiments described are some embodiments of the invention, but not all of embodiments. Based on the embodiments in the present invention, all other embodiments obtained by those of ordinary skill in the art without making creative labor fall within the scope of protection of the present invention.

Figure 1:
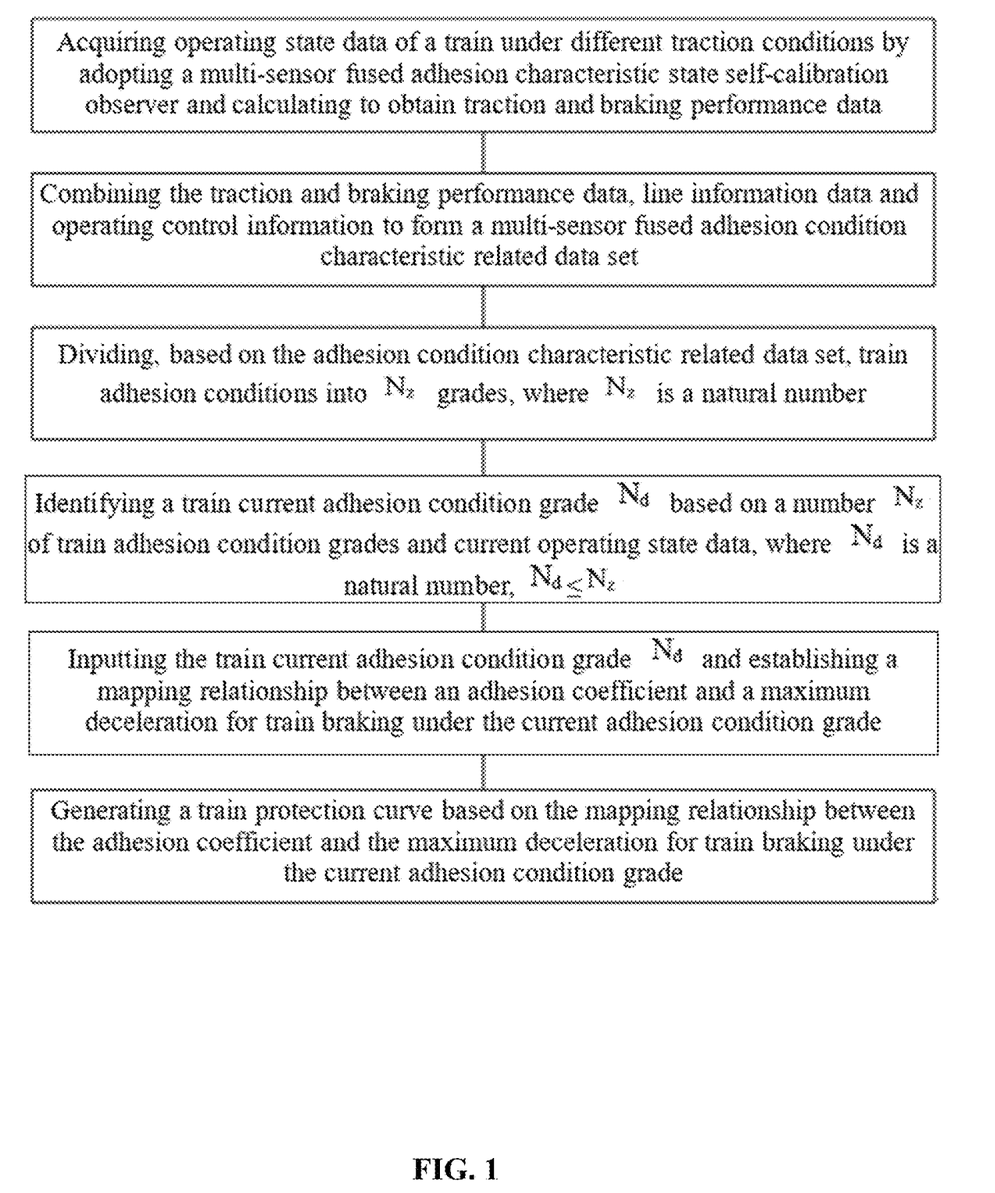
FIG. 1 shows a flow diagram of an adaptive control method based on train operating condition identification in an embodiment of the present invention.

As shown in FIG. 1, an embodiment of the present invention also describes an adaptive control method based on train operating condition identification, including: acquiring operating state data of a train under different traction conditions by adopting a multi-sensor fused adhesion characteristic state self-calibration observer and calculating to obtain traction and braking performance data; then, combining the traction and braking performance data, line information data and operating control information to form a multi-sensor fused adhesion condition characteristic related data set; then, dividing, based on the adhesion condition characteristic related data set, train adhesion conditions into $N_z$ grades by adopting a fuzzy clustering-based false nearest neighbors algorithm by adopting a fuzzy clustering-based false nearest neighbors algorithm, where $N_z$ is a natural number, and $$N_z \geq 2;$$

then, identifying a train current adhesion condition grade $N_d$ based on a number $N_z$ of train adhesion condition grades and current operating state data, where $N_d$ is a natural number and $$N_d \leq N_z;$$

then inputting the train current adhesion condition grade $N_d$ and establishing a mapping relationship between an adhesion coefficient and a maximum deceleration for train braking under the current adhesion condition grade; and, finally, generating a train protection curve based on the mapping relationship between the adhesion coefficient and the maximum deceleration for train braking under the current adhesion condition grade. The adaptive control method of the present invention clusters and grades the adhesion conditions through the clustering algorithm, such that the analysis on the adhesion conditions in a train operating process is more accurate, then the adhesion condition grades are obtained based on cluster analysis, and the train protection curve is adaptively generated, so that the control of the train is more reliable and the safety of the train operation is improved.

In the embodiment of the present invention, an automatic train protection (ATP) system executes the above method, where the ATP system acquires the operating state data of the train under the train traction condition and its own line information data and operating control information through the multi-sensor fused adhesion characteristic state self-calibration observer, where the multi-sensor fused adhesion characteristic state self-calibration observer includes but not limited to the axle speed sensor, the Doppler radar speed sensor, the accelerometer sensor, the humidity sensor and the temperature sensor, etc.

Specifically, the calculating the traction and braking performance data includes inputting the operating state data of a train under different traction conditions into corresponding train dynamics models and outputting traction and braking performance data, where the different train traction conditions of the train comprise five stages of starting, accelerating, cruising, idling and braking, and the train dynamics models of the train under different train traction conditions satisfy:

Model 1: $Y_1(t)=f_1(X(t-1),Z(t))+w_1(t)$,

Model 2: $Y_2(t)=f_2(X(t-1),Z(t))+w_2(t)$,

Model 3: $Y_3(t)=f_3(X(t-1),Z(t))+w_3(t)$,

Model 4: $Y_4(t)=f_4(X(t-1),Z(t))+w_4(t)$,

Model 5: $Y_5(t)=f_5(X(t-1),Z(t))+w_5(t)$, (1.1)

where Y(t), X(t−1) and Z(t) are an output of the model at time t, an internal state at time t−1 and an input at time t, respectively, $f_i(X(t-1), Z(t))$ represents a dynamics characteristic of an i-th traction condition which is fitted by adopting a deep learning algorithm at time t, and $w_i(t)$ represents a fitting error of the i-th traction condition at time t, i=1, 2, . . . , 5, that is, i is less than or equal to 5 and is an integer greater than 0. Further, the acquiring operating state data of a train under different train traction conditions by adopting a multi-sensor fused adhesion characteristic state self-calibration observer includes: measuring train operating speeds by adopting an axle speed sensor and a Doppler radar speed sensor respectively; acquiring a train acceleration by adopting an accelerometer sensor; and acquiring a temperature and humidity in an environment by adopting a temperature sensor and a humidity sensor respectively. Based on the multi-sensor fused data of the train under different traction conditions, real-time observation of train adhesion condition characteristic information is realized. But it is not limited to this, and each operating state data can be observed by adopting a variety of sensors with a same measurement target but different types, and calibration selection can be made to acquire most comprehensive and accurate operating data. Exemplarily, if in the starting stage the speed data collected by the axle speed sensor can better reflect a real-time operating state than the speed data collected by the Doppler radar speed sensor, the speed data collected by the axle speed sensor is adopted. Therefore, the observation of wheel adhesion is more comprehensive by adopting the multi-sensor fused adhesion characteristic state self-calibration observer, and the observation accuracy of the adhesion condition is improved.

In the embodiment of the present invention, the acquiring operating state data of a train under different traction conditions by adopting a multi-sensor fused adhesion characteristic state self-calibration observer further includes:

obtaining speed test data sets $V_{r,j}$ and $V_{d,j}$ respectively based on the measured train operating speeds, where $V_{r,j}$ is the data set corresponding to the train operating speed measured by the axle speed sensor, and $V_{d,j}$ is the data set measured by the Doppler radar speed sensor; and based on the data sets $V_{r,j}$ and $V_{d,j}$, calculating to obtain a speed measurement deviation data set $E_{r,j}$ and a train measurement speed data set $V_{c,j}$:

$$V_{c,j}=\cdot r1*g(V_{r,j})+\cdot r2*g(V_{d,j}) \quad (1.2)$$

$$E_{r,j}=\cdot h(V_{r,j}-V_{d,j}) \quad (1.3)$$

where r1 and r2 are speed-fused self-adjusting weight, g(•) and h(•) represent fusion strategy functions, subscripts r,j, d,j, c,j in $V_{r,j}$, $V_{d,j}$, $V_{c,j}$ are all used to distinguish different data sets; similarly, the subscripts r,j in $E_{r,j}$ are also used to distinguish data sets, j represents a data point in the data set, that is, the above data sets are all sets of data points.

Further, the method includes: combining the traction and braking performance data, line information data and operating control information to form a multi-sensor fused adhesion condition characteristic related data set, where the line information data includes line profile data; and the operating control information includes train control instructions and temporary speed limit information. An output result of the multi-sensor fused observer combined with line information data and operating control information is used as an off-line data set for the division of the adhesion condition characteristic grades, so that the analysis on the adhesion conditions is more reliable.

Cluster analysis or clustering is to divide similar objects into different groups or more subsets by static classification, so that member objects in the same subset have similar properties. In the embodiment of the present invention, based on the adhesion condition characteristic related data set, the number $N_z$ of train adhesion condition grades is obtained by analysis and calculation using the fuzzy clustering-based false nearest neighbors (FC-FNN) algorithm, where $N_z=\{1, 2, \ldots, R_m\}$, $R_m$ represents a number of clustering combinations of train adhesion characteristic data. The step specifically includes:

firstly, based on traction and braking performance data outputted by the train dynamics model, estimating an $R_m$ value; specifically, selecting an $R_m$ value based on experience;

secondly, randomly selecting $R_m$ data points from the adhesion condition characteristic related data set as first centroids, where $R_m$ represents a numerical value as a whole, and the subscript m is to explain that $R_m$ is a numerical value related to the centroid;

then, calculating a distance from each of the data points in the adhesion condition characteristic related data set to each of the first centroids by adopting an Euclidean distance calculation method and determining a set to which each of the data points in the adhesion condition characteristic related data set belongs; specifically, the cluster analysis process including: giving any of the first centroids $d_m$ in the adhesion condition characteristic related data set, selecting a neighbor data point $d_j$ of the first centroid $d_m$, where according to the Euclidean distance calculation method, the first centroid $d_m$ and the neighbor data point $d_j$ satisfy:

$$\begin{cases} v_m - v_j = \dfrac{\partial f(d_m)}{\partial t}[d_m - d_j] + o([d_m - d_j])^2 \\ m = 1, 2, \ldots, N_c, j = 1, 2, \ldots, N_c, m \neq j \end{cases} \quad (1.4)$$

where $V_m$ and $v_j$ are positions of the first centroid $d_m$ and the neighbor data point $d_j$ outputted by a system, $o(\bullet)^2$ represents a system high-order term, $N_c$ is a number of the data points in the adhesion condition characteristic related data set, m represents an m-th first centroid in the adhesion condition characteristic related data set, $m \in R_m$, and j represents a j-th data point in the adhesion condition characteristic related data set, and m and j are integers greater than 0;

if the data point $d_j$ is a false nearest neighbor data point of the first centroid $d_m$, according to the Cauchy inequality and the formula (1.4), deriving that:

$$\dfrac{|v_m - v_j|}{\|d_m - d_j\|_2} \leq R_m, R_m \approx \max \left\| \dfrac{\partial f(d_m)}{\partial t} \right\|_2 \quad (1.5)$$

where $R_m$ is a 2-norm of a Jacobian matrix of a model function at the data point $d_m$; and if the data point $d_j$ is a false nearest neighbor data point of the first centroid $d_m$, collecting the data point $d_j$ to the set where the first centroid $d_m$ is located.

Determining a clustering optimization model, so that the model order estimation problem can be transformed into the following optimization problem:

$$\underset{R_m}{\operatorname{argmin}} \, Q, Q(R_m) = N_r/N_c \quad (1.6)$$

where $Q(R_m)$ is a proportion of false nearest neighbor data points in the first centroid to total data points in a model input space, $N_r$ is a number of data points with false nearest neighbors in the first centroid, and $N_c$ is a number of the data points in the adhesion condition characteristic related data set; the setting of $R_m$ as the threshold in the FC-FNN algorithm shown in the formula (1.5) is one of key steps in the problem of adhesion characteristic type estimation.

regarding clustering of each of the first centroids as a local linearization in the model input space, which satisfies:

$$v_m = a_i^T d_m + b_i, i=1, \ldots, R \quad (1.7)$$

where $a_i^T$ and $b_i$ are linearization parameters of an i-th cluster $d_m$;

calculating a cluster membership degree of the adhesion condition characteristic related data set, specifically, calculating the cluster membership degree of the adhesion condition characteristic related data set by adopting a Gath-Geva clustering (distance clustering algorithm based on the probability) calculation method:

$$h_{i,m} = \dfrac{1}{\sum_{i=1}^{R_m} (D_{i,m}/D_{q,m})^{2/(w-1)}} \quad (1.8)$$

where $h_{i,m}$ is a membership degree of the first centroid $d_m$ in the i-th cluster, $D_{i,m}$ and $D_{q,m}$ are a distance from the first centroid $d_m$ to an i-th cluster center and a distance from the first centroid to a q-th cluster center respectively, and $w \in [1,\infty)$ is a weighted index number;

letting the center of the i-th cluster where the data point $d_m$ is located be $c_i$, determining minimum eigenvectors $\varphi_{i,min}$ of a fuzzy dividing matrix $$Q = [h_{i,m}]_{R_m \times N_C}$$

and a fuzzy covariance matrix $\Psi_i$ of the i-th cluster, where $$\varphi_{i,m}^T(s_m - c_i) = 0 \quad (1.9)$$

where $s_m = [d_m^T, v_m]^T$, $c_i = [(c_i^p)^T, c_i^v]^T$, $\varphi_{i,min} = [(\varphi_{i,min}^p)^T, \varphi_{i,min}^v]^T$, and p and v represent different minimum eigenvectors $\varphi_{i,min}$ of the fuzzy covariance matrix $\Psi_i$; deriving from the formula (1.9) to obtain:

$$v_m = \left( \dfrac{-1}{\varphi_{i,min}^v} (\varphi_{i,min}^p)^T \right) d_m^T + \dfrac{1}{\varphi_{i,min}^v} (\varphi_{i,min})^T c_i \quad (1.10)$$

where $$a_i^T = \dfrac{-1}{\varphi_{i,min}^v} (\varphi_{i,min}^p)^T \quad (1.11)$$

based on the formula (1.9), the formula (1.10) and the formula (1.11), deriving that:

$$\dfrac{\partial f(d_m)}{\partial t} = \sum_{i=1}^{R_m} h_{i,m} a_i^T \quad (1.12)$$

based on the formula (1.5), the formula (1.9), the formula (1.10) and the formula (1.12), deriving that:

$$R_m = \left\| \sum_{i=1}^{R_m} h_{i,m} \dfrac{-1}{\varphi_{i,min}^v} (\varphi_{i,min}^p)^T \right\|_2 . \quad (1.13)$$

Therefore, in combination with the formula (1.13), the number $R_m$ of cluster combinations of train adhesion characteristic data (that is, the number of data sets) can be calculated. The FC-FNN algorithm is used to cluster each data point in the adhesion condition characteristic related data set, so that high efficiency, good usability and a high convergence speed are achieved. In addition, the number $N_z$ of adhesion characteristic categories (that is, the number of train adhesion condition grades) in a complex and changeable environment is obtained, and the adhesion condition types are classified, which improves the analysis efficiency.

Then, after all the data are collected into corresponding sets, a centroid of each set is recalculated as a second centroid; and a distance between the first centroid and the second centroid corresponding to each set is calculated, and whether the algorithm is terminated based on the calculated distance is judged, where if the distance between the second centroid and the first centroid is less than a first preset threshold, the clustering has reached an expected result, and the algorithm is terminated, otherwise, the above steps are iterated to cluster the data. Here, the first preset threshold can be 0.1, 0.5, etc., but it is not limited to this, and 0.3 or the like is also applicable to the present invention. Further, $R_m$ sets themselves are graded based on different adhesion conditions, that is, $N_z$ train adhesion condition grades are obtained, that is, $N_z$ is also a set, and there are $R_m$ numbers in the set, $N_z\{1, 2, \ldots, R_m\}$, $R_m$ represents a number of clustering combinations of train adhesion characteristic data. It should be noted that in the embodiment of the present invention, there are differences in each data point in the adhesion condition characteristic related data set; exemplarily, radar speed measurement is a non-contact measurement method, which is not affected by the adhesion conditions, while a measurement result of the axle speed sensor is easily affected by the adhesion conditions, and there is a deviation between results of the radar speed measurement and the axle speed measurement under the conditions of idling acceleration and deceleration slippage. Moreover, the multi-sensor fused deviation is significantly different in the train operation at a low speed, a high speed, at an idle speed and other operating states, so that each data point in the adhesion condition characteristic related data set embodies the adhesion state, and in the process of clustering, the data points with better adhesion condition are mainly clustered in the same set, so that different data sets based on different adhesion conditions of data themselves constitute data sets with different adhesion condition grades. Exemplarily, if $R_m$=5, it means that there are 5 clustering date sets, $N_z=\{1, 2, 3, 4, 5\}$ Clustering and grading different data points can better acquire the adhesion conditions during train operation and improve the reliability of train operation.

In the embodiment of the present invention, the identifying a train current adhesion condition grade $N_d$ based on a number $N_z$ of train adhesion condition grades and current operating state data includes:

firstly, determining a current traction condition, a current adhesion condition characteristic related data set and a current speed measurement deviation data set $E_{r,j}'$ based on the current operating state data, where an acquisition method of the current adhesion condition characteristic related data set and the current speed measurement deviation data set $E_{r,j}'$ is the same as that of acquiring the adhesion condition characteristic related data set and the speed measurement deviation data set $E_{r,j}$ under the above different traction conditions, and only the related data set under the current operating state is solved here, so the details are not repeated here. In addition, the current time range can be a period of 10 seconds, that is, the current operation data is acquired once every 10 seconds and the corresponding data set is calculated, etc., but it is not limited to this, and the current time range can also be 15 seconds, 1 minute, etc., which is also applicable to the present invention.

A train current adhesion condition grade $N_d$ is judged based on the determined current traction condition, current adhesion condition characteristic related data set, current speed measurement deviation data set $E_{r,j}'$ and the number of train adhesion condition grades $N_z$ by adopting a data characteristic principal component analysis (PCA) method, where $N_d$ is a natural number, $$N_d \leq N_z \cdot N_d \in N_z,$$

subscripts d,z are for distinguishing $N_d$ and $N_z$ only, and has no special meaning. The specific algorithm steps are as follows:

step S101: standardizing current adhesion condition characteristic related data set D(t) (i.e. the adhesion condition characteristic related data set at time t) to obtain a standardized matrix $D_s(t)$.

step S102: solving a covariance matrix $XX^T$ of the standardized matrix $D_s(t)$;

step S103: performing eigenvalue decomposition on the covariance matrix $XX^T$ to obtain an eigenvalue and a corresponding eigenvector, where the eigenvalue represents a variance of a current adhesion condition characteristic at each adhesion condition grade (characteristic direction) in $N_z$; and the eigenvector represents a weight of a corresponding characteristic direction;

step S104: sorting the eigenvalues in a descending order, and selecting an adhesion characteristic corresponding to a maximum eigenvalue k as a principal component; and step S105: comprehensively evaluating the principal component determined in step S104, and comparing an evaluation result with the centroid in each set of $N_z$ grades, if the evaluation result is closest to an evaluation index of one of the centroids, the train adhesion condition grade corresponding to the centroid being the train current adhesion condition grade $N_d$. Exemplarily, if the principal component is a speed deviation in the current speed measurement deviation data set $E_{r,j}'$ (that is, the measurement deviation between the axle speed sensor and the Doppler radar speed sensor $E_{r,j}'$), the current speed measurement deviation data set $E_{r,j}'$ is comprehensively evaluated, and an evaluation result can be an average value of all speed deviations in the data set, but not limited to this, and other evaluation methods are also applicable to the present invention; and the evaluation result is compared with the centroid in each set of $N_z$ grades, if the evaluation result is closest to an evaluation index of one of the centroids, the adhesion condition grade corresponding to the centroid is the train current adhesion condition grade $N_d$. For example, if the evaluation index is the closest (that is, a difference between the average value of the speed deviations in the speed measurement deviation data set $E_{r,j}$ corresponding to one of all the centroids and the evaluation result is the minimum, that is, the two are the closest), then the adhesion condition grade corresponding to this centroid is the train current adhesion condition grade $N_d$.

In the embodiment of the present invention, the inputting the train current adhesion condition grade $N_d$ and establishing a mapping relationship between an adhesion coefficient and a maximum deceleration for train braking under the current adhesion condition grade includes:

determining the adhesion coefficient under the current train adhesion condition grade $N_d$:

$$\mu_{s,1} = \Phi(N_d) \tag{2-1}$$

where $\mu_{s,1}$ is the adhesion coefficient under the current adhesion condition grade, and subscripts s,1 are only used to distinguish different adhesion coefficients, and the following other subscripts corresponding to the adhesion coefficients are similar, which are omitted here; $N_d$ is the current adhesion condition grade, and $$N_d \in N_z. \qquad (5)$$

The adhesion condition grades are sorted according to adhesion state from bad to good, where a mapping function φ between the current adhesion condition grade and the adhesion coefficient satisfies:

$$\Phi(N_d) = \frac{N_d - C}{|N_z|} \alpha \qquad (2\text{-}2)$$

where represents α safety reduction coefficient, $N_z$ represents a number of train adhesion condition grades, and C represents an equal ratio reduction coefficient for the calculation of adhesion grades, a value of C can be 0.9, but it is not limited to this, and values ranging from 0.5 to 0.9 are applicable to the present invention.

An adhesion coefficient under a current train operating state is calculated:

$$\mu_{s,2} = \frac{F}{1000 \, Mg} \qquad (2\text{-}3)$$

where $\mu_{s,2}$ is a calculated value of the adhesion coefficient, and F is a traction or braking force of the train; M is a mass of a seating capacity for the train, and g is a gravitational acceleration; and correcting the adhesion coefficient under the current train adhesion condition grade $N_d$ based on the adhesion coefficient under the current train operating state, where the adhesion coefficient under the current train adhesion condition grade $N_d$ satisfies:

$$\mu_s = \min(\mu_{s,1}, \mu_{s,2}) \qquad (2\text{-}4)$$

the mapping relationship between the adhesion coefficient and the maximum deceleration for train braking under the current adhesion condition grade $N_d$ satisfies:

$$\alpha_\mu = \mu_s g \qquad (2\text{-}5)$$

where $\alpha_\mu$ is a maximum deceleration for train braking, and the subscript μ is only used to distinguish different decelerations, and the following other subscripts corresponding to the decelerations are the similar, which are omitted here; g is a gravitational acceleration.

In the embodiment of the present invention, the generating a train protection curve based on the mapping relationship between the adhesion coefficient and the maximum deceleration for train braking under the current adhesion condition grade includes:

determining train stop information based on mobile authorization information, where the train stop information includes a target position $s_{end}$ and a target speed $v_{end}$, and $v_{end}=0$;

dividing the train operating speed into a plurality of speed sections, and generating a deceleration for the train in each speed section, namely the following comprehensive deceleration; that is, dividing a speed limit protection process from the current speed (speed limit) of the train to the target speed of 0 into a plurality of speed sections with a default division method of speed sections, namely, a six-section method (0 km/h-60 km/h, 60 km/h-105 km/h, 105 km/h-160 km/h, 160 km/h-220 km/h, 220 km/h-265 km/h, 265 km/h-325 km/h), which is not limited to this and can be adjusted according to actual demands. The train deceleration is generated for the protection process in each speed section, and the deceleration cannot exceed a minimum value of a deceleration curve corresponding to the speed section.

acquiring real-time train information, where the real-time train information includes a train head position $s_{start}$, a train speed $v_0$, a train mass M and a train emergency braking characteristic curve $Q_E$;

calculating a corresponding protection curve in each speed section sequentially according to an opposite direction of a train operating direction by taking the target position as a starting point, specifically including:

step S201: initializing the speed section of which the protection curve is to be calculated, and recording as an i-th speed section, letting a final speed and an end position of the i-th speed section be $v_{end,i}=v_{end}$ and $s_{end,i}=s_{end}$ respectively;

step S202: reading an initial speed $v_{start,i}$ of the i-th speed section; and step S203: acquiring a train operating deceleration of the train in the i-th speed section, and generating a length of the i-th speed section based on the initial speeds $v_{start,i}$, $v_{end,i}$ and the train operating deceleration; specifically, according to the train emergency braking characteristic curve $Q_E$, reading a train braking deceleration $\alpha_{1,i}$ corresponding to the speed section, the initial speed and the final speed of any speed section being known when dividing the speed section, such as the speed section of 0 km/h-60 km/h, with the initial speed of 60 km/h and the final speed of 0 km/h;

correcting the train braking deceleration based on the maximum deceleration $\alpha_\mu$ for train braking under the current adhesion condition grade $N_d$ to generate the train operating deceleration $\alpha_{2,i}$:

$$\alpha_{2,i} = \min(\alpha_{1,i}, \alpha_\mu) \qquad (2\text{-}6)$$

generating the operating length of the i-th speed section based on the initial speeds $v_{start,i}$, $v_{end,i}$ and the train operating deceleration $\alpha_{2,i}$:

$$s_{i,1} = \frac{v_{start,i}^2 - v_{end,i}^2}{A_1 a_{2,i}} \qquad (2\text{-}7)$$

where $A_1$ is a first conversion unit coefficient, and a value of $A_1$ can be 25.92, where 25.92=2*3.6*3.6, and 3.6 is a conversion coefficient of km/h and m/s, and 2 is a coefficient of a kinematic equation, but it is not limited to this, and other conversion values are also applicable to the present invention.

step S204: acquiring a comprehensive deceleration of the i-th speed section under a gradient with a most unfavorable condition; specifically, selecting a maximum downhill from a position obtained after $s_{end,i}$ is subtracted from $s_{i,1}$ to a position $s_{end,i}$, and recording as a gradient value $w_i$, where when there is no downhill, the gradient value is recorded as $w_i=0$;

correcting the train operating deceleration $\alpha_{2,i}$ to acquire the comprehensive deceleration of the i-th speed section:

$$\alpha_i = a_{2,i} - \frac{w_i}{A_2} \quad (2\text{-}8)$$

where $A_2$ is a second conversion unit coefficient, and a value of $A_2$ can be 102, that is, 102=1000/9.8, where 1000 is a conversion coefficient of t (tons) and kg (kilograms), and 9.8 is a gravitational acceleration, but it is not limited to this, and other conversion values in other situations are also applicable to the present invention.

step S205: recalculating the operating length of the i-th speed section and an entrance position of the i-th speed section and generating the protection curve in the i-th speed section based on the comprehensive deceleration; specifically, the operating length of the i-th speed section satisfying:

$$s_i = \frac{v_{start,i}^2 - v_{end,i}^2}{A_1 a_i} \quad (2\text{-}9)$$

the entrance position of the i-th speed section satisfying:

$$s_{start,i} = s_{end,i} - s_i \quad (2\text{-}10)$$

the protection curve in the i-th speed section being:

$$v(x) = \sqrt{v_{start,i}^2 - A_1 a_i x} \quad (2\text{-}11)$$

where x is a length of a distance $s_{start,i}$, $s_{start,i} \leq x \leq s_i$, $v_{start,i}$ is an initial speed of the i-th speed section, and $\alpha_i$ is the comprehensive deceleration of the i-th speed section.

step S206: judging whether the entrance position $s_{start,i}$ of the i-th speed section exceeds a train start position $s_{start}$, if the entrance position of the i-th speed section exceeds the train start position, taking a train speed $v_0$ as an upper speed limit of the i-th speed section, and re-executing steps S203-S205; if the entrance position of the i-th speed section does not exceed the train start position, judging whether the i-th speed section is a last speed section, if so, ending the algorithm, and taking a current speed limit as the protection curve from the train start position $s_{start}$ to the entrance position $s_{start,i}$ of the i-th speed section; and if not, starting to calculate a next speed section, letting i=i+1, $v_{end,i}=v_{start,i-1}$, $s_{end,i}=s_{start,i-1}$, and re-executing steps S202-S205. The above current speed limit is a current speed limit value of the train. Exemplarily, all the trains are operating at the speed limit of 350 km/h, so they will continue to operate at the speed limit of 350 km/h until the i-th speed section.

Then, based on the protection curve of each speed section, the train protection curve is outputted, that is, the curve of each speed section is connected to output the train protection curve. Further, the method also includes: calculating the operating time of each speed section and the total braking distance of the train $L_b$, where the operating time of the i-th speed section satisfies:

$$t_i = \frac{v_{start,i} - v_{end,i}}{A_3 a_i} \quad (2\text{-}12)$$

where $A_3$ is a third conversion unit coefficient, a value of $A_3$ can be 3.6, and 3.6 is a conversion coefficient of km/h and m/s, but it is not limited to this, and other conversion values are also applicable to the present invention.

$L_b$ is a sum of corresponding operating lengths of the plurality of speed sections.

The protection curve defines speed limits of the train from the current position to the authorized position (target position), and can directly generate the operating time of each speed section and a total braking distance of the train. The train protection curve generated based on the adhesion condition identification is used for adaptive control of the train, so that the problem of insufficient protection or excessive protection in the prior art is effectively solved, and the operating safety of the train is improved; furthermore, the influence of real-time changes of conditions and train operating states can be considered in the embodiment of the present invention, and the accuracy and reliability of the protection curve are improved.

Figure 2:
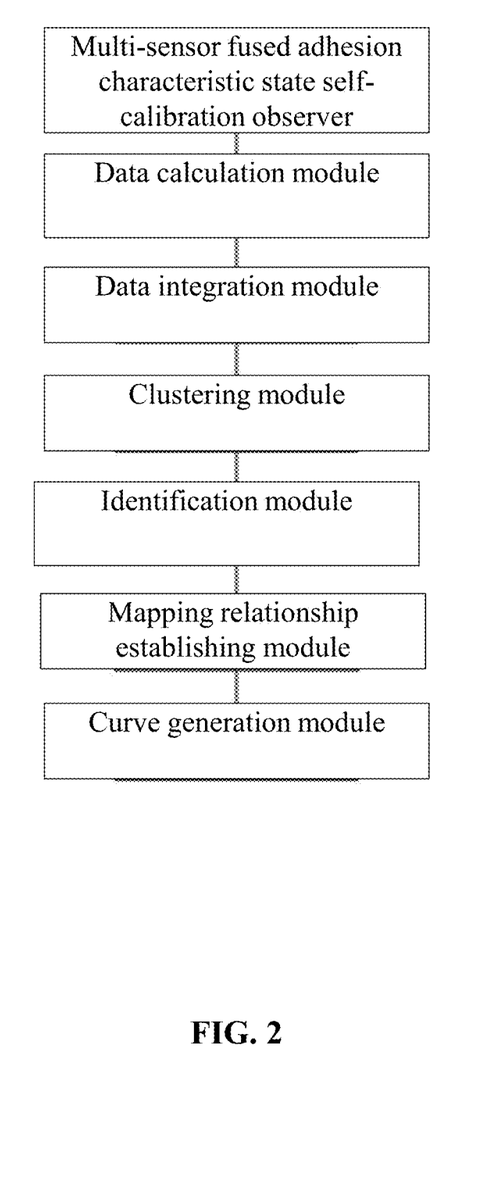
FIG. 2 shows a structural diagram of an adaptive control system based on train operating condition identification in an embodiment of the present invention.

As shown in FIG. 2, an embodiment of the present invention also describes an adaptive control system based on train operating condition identification capable of executing the above method, including: a multi-sensor fused adhesion characteristic state self-calibration observer configured to obtain the operating state data of a train under different traction conditions; a data calculation module configured to calculate to obtain traction and braking performance data based on the acquired operating state data of the train under different traction conditions; a data integration module configured to combine the traction and braking performance data, line information data and operating control information to form a multi-sensor fused adhesion condition characteristic related data set; a clustering module configured to divide, based on the adhesion condition characteristic related data set, train adhesion conditions into $N_z$ grades by adopting a fuzzy clustering-based false nearest neighbors algorithm, where $N_z$ is a natural number, and $$N_z \geq 2;$$

an identification module configured to identify a train current adhesion condition grade $N_d$ based on a number $N_z$ of train adhesion condition grades and current operating state data, where $N_d$ is a natural number, and a mapping $$N_d \leq N_z,$$

and $$N_d \in N_z;$$

a mapping relationship establishing module configured to input the train current adhesion condition grade $N_d$ and establish a mapping relationship between an adhesion coefficient and a maximum deceleration for train braking under the current adhesion condition grade; and a curve generation module configured to generate a train protection curve based on the mapping relationship between the adhesion coefficient and the maximum deceleration for train braking under the current adhesion condition grade. The various modules are also used to execute the corresponding method processes which are the same as those in the above method, and it is not repeated here. By clustering and grading the adhesion conditions through the clustering algorithm, the analysis on the adhesion conditions in a train operating process is more accurate, the adhesion condition grades are obtained based on cluster analysis, and the train protection curve is adaptively generated, so that the control of the train is more reliable and the safety of the train operation is improved.

Although the present invention has been described in detail with reference to the aforementioned embodiments, it should be understood by those of ordinary skill in the art that modifications may be made to the technical solutions described in the foregoing embodiments, or equivalents may be substituted for some of the technical features thereof, and these modifications or substitutions do not make the essence of the corresponding technical solutions deviate from the spirit and the scope of the technical solutions of the embodiments of the present invention.

What is claimed is:

1. An adaptive control method based on train operating condition identification, comprising:

acquiring operating state data of a train under different traction conditions by adopting a multi-sensor fused adhesion characteristic state self-calibration observer and calculating to obtain traction and braking performance data;

combining the traction and braking performance data, line information data and operating control information to form a multi-sensor fused adhesion condition characteristic related data set;

dividing, based on the adhesion condition characteristic related data set, train adhesion conditions into $N_z$ grades by adopting a fuzzy clustering-based false nearest neighbors algorithm, wherein $N_z$ is a natural number, and $$N_z \geq 2;$$

identifying a train current adhesion condition grade $N_d$ based on a number $N_z$ of train adhesion condition grades and current operating state data, wherein $N_d$ is a natural number, $$N_d \leq N_z,$$

and $$N_d \in N_z;$$

inputting the train current adhesion condition grade $N_d$ and establishing a mapping relationship between an adhesion coefficient and a maximum deceleration for train braking under the current adhesion condition grade; and generating a train protection curve based on the mapping relationship between the adhesion coefficient and the maximum deceleration for train braking under the current adhesion condition grade.

2. The adaptive control method based on train operating condition identification according to claim 1, wherein the calculating the traction and braking performance data comprises inputting the operating state data of a train under different traction conditions into corresponding train dynamics models, wherein the different traction conditions of the train comprise starting, accelerating, cruising, idling and braking stages, and the train dynamics models of the train under different traction conditions satisfy:

Model 1: $Y_1(t)=f_1(X(t-1),Z(t))+w_1(t),$

Model 2: $Y_2(t)=f_2(X(t-1),Z(t))+w_2(t),$

Model 3: $Y_3(t)=f_3(X(t-1),Z(t))+w_3(t),$

Model 4: $Y_4(t)=f_4(X(t-1),Z(t))+w_4(t),$

Model 5: $Y_5(t)=f_5(X(t-1),Z(t))+w_5(t),$ (1.1)

wherein Y(t), X(t−1) and z(t) are an output of the model at time t, an internal state at time t−1 and an input at time t, respectively, $f_i(X(t-1), Z(t))$ represents a dynamics characteristic of an i-th traction condition which is fitted by adopting a deep learning algorithm at time t, and $w_i(t)$ represents a fitting error of the i-th traction condition at time t, wherein i is less than or equal to 5 and is an integer.

3. The adaptive control method based on train operating condition identification according to claim 2, wherein the acquiring operating state data of a train under different traction conditions by adopting a multi-sensor fused adhesion characteristic state self-calibration observer comprises:

measuring train operating speeds by adopting an axle speed sensor and a Doppler radar speed sensor respectively;

acquiring a train acceleration by adopting an accelerometer sensor;

acquiring a temperature and humidity in an environment by adopting a temperature sensor and a humidity sensor respectively;

obtaining speed test data sets $V_{r,j}$ and $V_{d,j}$ respectively based on the measured train operating speeds, wherein $V_{r,j}$ is the data set corresponding to the train operating speed measured by the axle speed sensor, and $V_{d,j}$ is the data set measured by the Doppler radar speed sensor; and based on the data sets $V_{r,j}$ and $V_{d,j}$, calculating to obtain a speed measurement deviation data set $E_{r,j}$ and a train measurement speed data set $V_{c,j}$, which are described as follows:

$$V_{c,j}=\cdot r1*g(V_{r,j})+\cdot r2*g(V_{d,j}) \quad (1.2)$$

$$E_{r,j}=\cdot h(V_{r,j}-V_{d,j}) \quad (1.3)$$

wherein r1 and r2 are speed-fused self-adjusting weights, and g(•) and h(•) represent fusion strategy functions.

4. The adaptive control method based on train operating condition identification according to claim 1, wherein the line information data comprises line profile data; and the operating control information comprises train control instructions and a temporary speed limit.

5. The adaptive control method based on train operating condition identification according to claim 3, wherein the dividing train adhesion conditions into $N_z$ grades by adopting a fuzzy clustering-based false nearest neighbors algorithm specifically comprises:

estimating an $R_m$ value based on the traction and braking performance data outputted by the train dynamics model;

randomly selecting $R_m$ data points from the adhesion condition characteristic related data set as first centroids;

calculating a distance from each of the data points in the adhesion condition characteristic related data set to each of the first centroids by adopting an Euclidean distance calculation method and determining a set to which each of the data points in the adhesion condition characteristic related data set belongs;

recalculating, after all the data are collected into corresponding sets, a centroid of each set as a second centroid; and calculating a distance between the first centroid and the second centroid, and judging whether the algorithm is terminated based on the calculated distance, wherein if the distance between the second centroid and the first centroid is less than a first preset threshold, the algorithm is terminated, otherwise, the above steps are repeated to cluster the data.

6. The adaptive control method based on train operating condition identification according to claim 5, wherein the calculating a distance from each of the data points in the adhesion condition characteristic related data set to each of the first centroids by adopting an Euclidean distance calculation method and determining a set to which each of the data points in the adhesion condition characteristic related data set belongs comprises determining a false nearest neighbor data point of each of the first centroids comprises:

giving any of the first centroids $d_m$ in the adhesion condition characteristic related data set, selecting a neighbor data point $d_j$ of the first centroid $d_m$, wherein according to the Euclidean distance calculation method, the first centroid $d_m$ and the neighbor data point $d_j$ satisfy:

$$\begin{cases} v_m - v_j = \frac{\partial f(d_m)}{\partial t}[d_m - d_j] + o([d_m - d_j])^2 \\ m = 1, 2, \ldots, N_c, j = 1, 2, \ldots, N_c, m \neq j \end{cases} \quad (1.4)$$

wherein $v_m$ and $v_j$ are positions of the first centroid $d_m$ and the neighbor data point $d_j$ outputted by a system, $o(\cdot)^2$ represents a system high-order term, $N_c$ is a number of the data points in the adhesion condition characteristic related data set, m represents an m-th first centroid in the adhesion condition characteristic related data set, and j represents a j-th data point in the adhesion condition characteristic related data set;

if the data point $d_j$ is a false nearest neighbor data point of the first centroid $d_m$; then satisfying:

$$\frac{|v_m - v_j|}{\|d_m - d_j\|} \leq R_m, R_m \approx \max\left\|\frac{\partial f(d_m)}{\partial t}\right\|_2 \quad (1.5)$$

wherein $R_m$ is a 2-norm of a Jacobian matrix of a model function at the data point $d_m$; and if the data point $d_j$ is a false nearest neighbor data point of the first centroid $d_m$, collecting the data point $d_j$ to the set where the first centroid $d_m$ is located.

7. The adaptive control method based on train operating condition identification according to claim 6, wherein the determining a set to which each of the data points in the adhesion condition characteristic related data set belongs further comprises determining a number $R_m$ of the first centroids, comprising:

determining a clustering optimization model:

$$\arg\min_{R_m} Q, Q(R_m) = N_r / N_c \quad (1.6)$$

wherein $Q(R_m)$ is a proportion of false nearest neighbor data points in the first centroid to total data points in a model input space, $N_r$ is a number of the false nearest neighbor data points in the first centroid, and $N_d$ is a number of the data points in the adhesion condition characteristic related data set;

regarding clustering of each of the first centroids as a local linearization in the model input space, which satisfies:

$$v_m = a_i^T d_m + b_i, i=1, \ldots R \quad (1.7)$$

wherein $a_i^T$ and $b_i$ are linearization parameters of an i-th cluster $d_m$;

calculating a cluster membership degree of the adhesion condition characteristic related data set, which satisfies:

$$h_{i,m} = \frac{1}{\sum_{i=1}^{R_m}(D_{i,m}/D_{q,m})^{2/(w-1)}} \quad (1.8)$$

wherein $h_{i,m}$ is a membership degree of the first centroid $d_m$ in the i-th cluster, $D_{i,m}$ and $D_{q,m}$ are a distance from the first centroid $d_m$ to an i-th cluster center and a D distance from the first centroid to a q-th cluster center respectively, and $w \in [1,\infty)$ is a weighted index number;

letting the center of the i-th cluster where the data point $d_m$ is located be $c_i$, determining minimum eigenvectors $\varphi_{i,min}$ of a fuzzy dividing matrix $$Q = [h_{i,m}]_{R_m \times N_c}$$

and a fuzzy covariance matrix $\Psi_i$ of the i-th cluster, wherein $$\varphi_{i,m}^T(s_m - c_i) = 0 \quad (1.9)$$

wherein $s_m = [d_m^T, v_m^T]^T$, $c_i = [(c_i^p)^T, c_i^v]^T$, $\varphi_{i,min} = [(\varphi_{i,min}^p)^T, \varphi_{i,min}^v]^T$, and p and v represent different minimum eigenvectors $\varphi_{i,min}$ of the fuzzy covariance matrix $\Psi_i$;

deriving from the formula (1.9) to obtain:

$$v_m = \left(\frac{-1}{\varphi_{i,min}^v}(\varphi_{i,min}^p)^T\right)d_m^T + \frac{1}{\varphi_{i,min}^v}(\varphi_{i,min})^T c_i \quad (1.10)$$

wherein $$a_i^T = \frac{-1}{\varphi_{i,min}^v}(\varphi_{i,min}^p)^T \quad (1.11)$$

based on the formula (1.9), the formula (1.10) and the formula (1.11), deriving that:

$$\frac{\partial f(d_m)}{\partial t} = \sum_{i=1}^{R_m} h_{i,m} a_i^T \quad (1.12)$$

based on the formula (1.5), the formula (1.9), the formula (1.10) and the formula (1.12), deriving that:

$$R_m = \left\| \sum_{i=1}^{R_m} h_{i,m} \frac{-1}{\varphi_{i,min}^v} (\varphi_{i,min}^p)^T \right\|_2, \quad (1.13)$$

wherein $R_m$ first centroids represent $R_m$ sets, and $N_z = \{1, 2, \ldots, R_m\}$.

8. The adaptive control method based on train operating condition identification according to claim 7, wherein the identifying a train current adhesion condition grade $N_d$ based on a number $N_z$ of train adhesion condition grades and current operating state data comprises:

determining a current traction condition, a current adhesion condition characteristic related data set and a current speed measurement deviation data set $E_{r,j}'$ based on the current operating state data;

judging a current adhesion condition grade $N_d$ based on the determined current traction condition, current adhesion condition characteristic related data set, current speed $N_z$ measurement deviation data set $E_{r,j}'$ and the number of train adhesion condition grades by adopting a data characteristic principal component analysis method, comprising:

step S101: standardizing current adhesion condition characteristic related data set $D_s(t)$ to obtain a standardized matrix $D_s(t)$;

step S102: solving a covariance matrix $XX^T$ of the standardized matrix $D_s(t)$;

step S103: performing eigenvalue decomposition on the covariance matrix $XX^T$ to obtain an eigenvalue and a corresponding eigenvector, wherein the eigenvalue represents a variance of a current adhesion condition characteristic at each adhesion condition grade in $N_z$, and the eigenvector represents a weight of a corresponding characteristic direction;

step S104: sorting the eigenvalues in a descending order, and selecting an adhesion characteristic corresponding to a maximum eigenvalue k as a principal component; and step S105: comprehensively evaluating the principal component determined in step S104, and comparing an evaluation result with the centroid in each set of $N_z$ grades, if the evaluation result is closest to an evaluation index of one of the centroids, the train adhesion condition grade corresponding to the centroid being the train current adhesion condition grade $N_d$ wherein $$N_d \in N_z.$$

9. The adaptive control method based on train operating condition identification according to claim 8, wherein the inputting the train current adhesion condition grade $N_d$ and establishing a mapping relationship between an adhesion coefficient and a maximum deceleration for train braking under the current adhesion condition grade comprises:

determining the adhesion coefficient under the current train adhesion condition grade $N_d$:

$$\mu_{s,1} = \Phi(N_d) \quad (2\text{-}1)$$

wherein $\mu_{s,1}$ is the adhesion coefficient under the current adhesion condition grade; $N_d$ is the current adhesion condition grade, wherein $$N_d \in N_z;$$

sorting the adhesion condition grades according to adhesion state from bad to good, wherein a mapping function $\varphi$ between the current adhesion condition grade and the adhesion coefficient satisfies:

$$\Phi(N_d) = \frac{N_d - C}{|N_z|} \alpha \quad (2\text{-}2)$$

wherein C represents an equal ratio reduction coefficient for the calculation of the adhesion grade, and $\alpha$ represents a safety reduction coefficient;

calculating an adhesion coefficient under a current train operating state:

$$\mu_{s,2} = \frac{F}{1000\,Mg} \quad (2\text{-}3)$$

wherein $\mu_{s,2}$ is a calculated value of the adhesion coefficient, and F is a traction or braking force of the train; M is a mass of a seating capacity for the train, and g is a gravitational acceleration; and correcting the adhesion coefficient under the current train adhesion condition grade $N_d$ based on the adhesion coefficient under the current train operating state, wherein the adhesion coefficient under the current train adhesion condition grade $N_d$ satisfies:

$$\mu_s = \min(\mu_{s,1}, \mu_{s,2}) \quad (2\text{-}4)$$

the mapping relationship between the adhesion coefficient and the maximum deceleration for train braking under the current train adhesion condition $N_d$ satisfies:

$$\alpha_\mu = \mu_s g \quad (2\text{-}5)$$

wherein $\alpha_\mu$ is the maximum deceleration for train braking, and g is the gravitational acceleration.

10. The adaptive control method based on train operating condition identification according to claim 9, wherein the generating a train protection curve based on the mapping relationship between the adhesion coefficient and the maximum deceleration for train braking under the current adhesion condition grade comprises:

determining train stop information based on mobile authorization information, wherein the train stop information comprises a target position $s_{end}$ and a target speed $v_{end}$, and $v_{end} = 0$;

dividing the train operating speeds into a plurality of speed sections;

acquiring real-time train information, wherein the real-time train information comprises a train head position $s_{start}$, a train speed $v_0$, a train mass M and a train emergency braking characteristic curve $Q_E$;

calculating a corresponding protection curve in each speed section sequentially according to an opposite direction of a train operating direction by taking the target position as a starting point; and outputting a train protection curve based on the protection curve of each speed section.

11. The adaptive control method based on train operating condition identification according to claim 10, wherein the calculating a corresponding protection curve in each speed section sequentially according to an opposite direction of a train operating direction by taking the target position as a starting point comprises:

step S201: initializing the speed section of which the protection curve is to be calculated, and recording as an i-th speed section, letting a final speed and an end position of the i-th speed section be $v_{end,i}=v_{end}$ and $s_{end,i}=s_{end}$ respectively;

step S202: reading an initial speed $v_{start,i}$ of the i-th speed section; and step S203: acquiring a train operating deceleration of the train in the i-th speed section, and generating an operating length of the i-th speed section based on the initial speeds $v_{start,i}$, $v_{end,i}$ and the train operating deceleration, comprising:

reading a train braking deceleration $\alpha_{1,i}$ corresponding to the i-th speed section according to the train emergency braking characteristic curve $Q_E$;

correcting the train braking deceleration $\alpha_{1,i}$ based on the maximum deceleration $\alpha_\mu$ for train braking under the train current adhesion condition grade $N_d$ to generate the train operating deceleration $\alpha_{2,i}$ of the i-th speed section:

$$\alpha_{2,i}=\min(\alpha_{1,i},\alpha_\mu) \quad (2\text{-}6)$$

generating the operating length of the i-th speed section based on the initial speeds $v_{start,i}$, $v_{end,i}$ and the train operating deceleration:

$$s_{i,1} = \frac{v_{start,i}^2 - v_{end,i}^2}{A_1 a_{2,i}} \quad (2\text{-}7)$$

wherein $A_1$ is a first conversion unit coefficient;

step S204: acquiring a comprehensive deceleration of the i-th speed section under a gradient with a most unfavorable condition, comprising:

selecting a maximum downhill from a position obtained after $s_{end,i}$ is subtracted from $s_{i,1}$ to a position $s_{end,i}$, and recording as a gradient value $w_i$, wherein when there is no downhill, the gradient value is recorded as $w_i=0$;

correcting the train operating deceleration $\alpha_{2,i}$ to acquire the comprehensive deceleration of the i-th speed section:

$$a_i = \alpha_{2,i} - \frac{w_i}{A_2} \quad (2\text{-}8)$$

wherein $A_2$ is a second conversion unit coefficient;

step S205: recalculating the operating length of the i-th speed section and an entrance position of the i-th speed section and generating the protection curve in the i-th speed section based on the comprehensive deceleration; and step S206: judging whether the entrance position of the i-th speed section exceeds a train start position $s_{start}$, if the entrance position of the i-th speed section exceeds the train start position, taking a train speed $v_0$ as an upper speed limit of the i-th speed section, and re-executing steps S203-S205; if the entrance position of the i-th speed section does not exceed the train start position, judging whether the i-th speed section is a last speed section, if so, ending the algorithm, and taking a current speed limit as the protection curve from the train start position $s_{start}$ to the entrance position $s_{start,i}$ of the i-th speed section; and if not, starting to calculate a next speed section, letting i=i+1, $v_{end,i}=v_{start,i}-1$, $s_{end,i}=s_{start,i-1}$ and re-executing steps S202-S205.

12. The adaptive control method based on train operating condition identification according to claim 11, wherein the recalculating the operating length of the i-th speed section and an entrance position of the i-th speed section and generating the protection curve in the i-th speed section based on the comprehensive deceleration comprises:

the length of the i-th speed section satisfying:

$$s_i = \frac{v_{start,i}^2 - v_{end,i}^2}{A_1 a_i} \quad (2\text{-}9)$$

the entrance position of the i-th speed section satisfying:

$$s_{start,i}=s_{end,i}-s_i \quad (2\text{-}10)$$

the protection curve in the i-th speed section being:

$$v(x) = \sqrt{v_{start,i}^2 - A_1 a_i x} \quad (2\text{-}11)$$

wherein x is a length of a distance $s_{start,i}$, $s_{start,i} \leq x \leq s_i$, $v_{start,i}$ is an initial speed of the i-th speed section, and $\alpha_i$; is the comprehensive deceleration of the i-th speed section.

13. The adaptive control method based on train operating condition identification according to claim 12, further comprising calculating a train braking distance $L_b$, $L_b$ being a sum of corresponding operating lengths of multiple speed sections.

14. An adaptive control system based on train operating condition identification, comprising:

a multi-sensor fused adhesion characteristic state self-calibration observer configured to acquire operating state data of a train under different traction conditions;

a data calculation module configured to calculate to obtain traction and braking performance data based on the acquired operating state data of the train under different traction conditions;

a data integration module configured to combine the traction and braking performance data, line information data and operating control information to form a multi-sensor fused adhesion condition characteristic related data set;

a clustering module configured to divide, based on the adhesion condition characteristic related data set, train adhesion conditions into $N_z$ grades by adopting a fuzzy clustering-based false nearest neighbors algorithm, wherein $N_z$ is a natural number, and $$N_z \geq 2;$$

an identification module configured to identify a train current adhesion condition grade $N_d$ based on a number $N_z$ of train adhesion condition grades and current operating state data, wherein $N_d$ is a natural number, $$N_d \le N_z;$$

and $$N_d \in N_z;$$

a mapping relationship establishing module configured to input the train current adhesion condition grade $N_d$ and establish a mapping relationship between an adhesion coefficient and a maximum deceleration for train braking under the current adhesion condition grade; and a curve generation module configured to generate a train protection curve based on the mapping relationship between the adhesion coefficient and the maximum deceleration for train braking under the current adhesion condition grade.

15. The adaptive control system based on train operating condition identification according to claim 14, wherein the multi-sensor fused adhesion characteristic state self-calibration observer comprises:

an axle speed sensor and a Doppler radar speed sensor configured to measure train operating speeds;

an accelerometer sensor configured to acquire a train acceleration; and a temperature sensor and a humidity sensor configured to acquire a temperature and humidity in an environment respectively; and the calculating the traction and braking performance data comprises inputting the operating state data of a train under different traction conditions into corresponding train dynamics models, wherein the different traction conditions of the train comprise starting, accelerating, cruising, idling and braking stages, and the train dynamics models of the train under different traction conditions satisfy:

Model 1: $Y_1(t)=f_1(X(t-1),Z(t))+w_1(t)$,

Model 2: $Y_2(t)=f_2(X(t-1),Z(t))+w_2(t)$,

Model 3: $Y_3(t)=f_3(X(t-1),Z(t))+w_3(t)$,

Model 4: $Y_4(t)=f_4(X(t-1),Z(t))+w_4(t)$,

Model 5: $Y_5(t)=f_5(X(t-1),Z(t))+w_5(t)$,  (1.1)

wherein Y(t), w(t−1) and z(t) are an output of the model at time t, an internal state at time t−1 and an input at time t, respectively, $f_i(X(t-1), Z(t))$ represents a dynamics characteristic of an i-th traction condition which is fitted by adopting a deep learning algorithm at time t, and $w_i(t)$ represents a fitting error of the i-th traction condition at time t, wherein i is less than or equal to 5 and is an integer.

16. The adaptive control system based on train operating condition identification according to claim 15, wherein the acquiring operating state data of a train under different traction conditions by adopting a multi-sensor fused adhesion characteristic state self-calibration observer further comprises:

obtaining speed test data sets $V_{r,j}$ and $V_{d,j}$ respectively based on the measured train operating speeds, wherein $V_{r,j}$ is the data set corresponding to the train operating speed measured by the axle speed sensor, and $V_{d,j}$ is the data set measured by the Doppler radar speed sensor; and based on the data sets $V_{r,j}$ and $V_{d,j}$ calculating to obtain a speed measurement deviation data set $E_{r,j}$ and a train measurement speed data set $V_{c,j}$, which are described as follows:

$$V_{c,j}=\cdot r1*g(V_{r,j})+\cdot r2*g(V_{d,j}) \qquad (1.2)$$

$$E_{r,j}=\cdot h(V_{r,j}-V_{d,j}) \qquad (1.3)$$

wherein r1 and r2 are speed-fused self-adjusting weights, and g(•) and h(•) represent fusion strategy functions;

the line information data comprises line profile data; and the operating control information comprises train control instructions and a temporary speed limit.

17. The adaptive control system based on train operating condition identification according to claim 16, wherein the dividing train adhesion conditions into $N_z$ grades by adopting a fuzzy clustering-based false nearest neighbors algorithm specifically comprises:

estimating an $R_m$ value based on the traction and braking performance data outputted by the train dynamics model;

randomly selecting $R_m$ data points from the adhesion condition characteristic related data set as first centroids;

calculating a distance from each of the data points in the adhesion condition characteristic related data set to each of the first centroids by adopting an Euclidean distance calculation method and determining a set to which each of the data points in the adhesion condition characteristic related data set belongs, comprising:

giving any of the first centroids $d_m$ in the adhesion condition characteristic related data set, selecting a neighbor data point $d_j$ of the first centroid $d_m$, wherein according to the Euclidean distance calculation method, the first centroid $d_m$ and the neighbor data point $d_j$ satisfy:

$$\begin{cases} v_m - v_j = \frac{\partial f(d_m)}{\partial t}[d_m - d_j] + o([d_m - d_j])^2 \\ m = 1, 2, \dots, N_o, j = 1, 2, \dots, N_o, m \ne j \end{cases} \qquad (1.4)$$

wherein $v_m$ and $v_j$ are positions of the first centroid $d_m$ and the neighbor data point $d_j$ outputted by a system, $o(\cdot)^2$ represents a system high-order term, $N_c$ is a number of the data points in the adhesion condition characteristic related data set, m represents an m-th first centroid in the adhesion condition characteristic related data set, and j represents a j-th data point in the adhesion condition characteristic related data set;

if the data point $d_j$ is a false nearest neighbor data point of the first centroid $d_m$, then satisfying:

$$\frac{|v_m - v_j|}{\|d_m - d_j\|_2} \le R_m, R_m \approx \max\left\|\frac{\partial f(d_m)}{\partial t}\right\|_2 \qquad (1.5)$$

wherein $R_m$ is a 2-norm of a Jacobian matrix of a model function at the data point $d_m$; and if the data point $d_j$ is a false nearest neighbor data point of the first centroid $d_m$, collecting the data point $d_j$ to the set where the first centroid $d_m$ is located;

recalculating, after all the data are collected into corresponding sets, a centroid of each set as a second centroid; and calculating a distance between the first centroid and the second centroid, and judging whether the algorithm is terminated based on the calculated distance, wherein if the distance between the second centroid and the first centroid is less than a first preset threshold, the algorithm is terminated, otherwise, the above steps are repeated to cluster the data;

determining a set to which each of the data points in the adhesion condition characteristic related data set belongs further comprises determining a number $R_m$ of the first centroids, comprising:

determining a clustering optimization model:

$$\underset{R_m}{\operatorname{argmin}} Q, \quad Q(R_m) = N_r/N_c \qquad (1.6)$$

wherein $Q(R_m)$ is a proportion of false nearest neighbor data points in the first centroid to total data points in a model input space, $N_r$ is a number of the false nearest neighbor data points in the first centroid, and $N_c$ is a number of the data points in the adhesion condition characteristic related data set;

regarding clustering of each of the first centroids as a local linearization in the model input space, which satisfies:

$$v_m = a_i^T d_m + b_i, \; i=1,\ldots,R \qquad (1.7)$$

where $a_i^T$ and $b_i$ are linearization parameters of an i-th cluster $d_m$;

calculating a cluster membership degree of the adhesion condition characteristic related data set, which satisfies:

$$h_{i,m} = \frac{1}{\sum_{i=1}^{R_m} (D_{i,m}/D_{q,m})^{2/(w-1)}} \qquad (1.8)$$

wherein $h_{i,m}$ is a membership degree of the first centroid $d_m$ in the i-th cluster, $D_{i,m}$ and $D_{q,m}$ are a distance from the first centroid $d_m$ to an i-th cluster center and a distance from the first centroid to a q-th cluster center respectively, and $w \in [1, \infty)$ is a weighted index number;

letting the center of the i-th cluster where the data point $d_m$ is located be $c_i$, determining minimum eigenvectors $\varphi_{i,min}$ of a fuzzy dividing matrix $$Q = [h_{i,m}]_{R_m \times N_c}$$

and a fuzzy covariance matrix $\Psi_i$ of the i-th cluster, wherein $$\varphi_{i,m}^T (s_m - c_i) = 0 \qquad (1.9)$$

where $s_m = [d_m^T, v_m]^T$, $c_i = [(c_i^p)^T, c_i^v]^T$, $\varphi_{i,min} = [(\varphi_{i,min}^p)^T, \varphi_{i,min}^v]^T$, and p and v represent different minimum eigenvectors $\varphi_{i,min}$ of the fuzzy covariance matrix $\Psi_i$;

deriving from the formula (1.9) to obtain:

$$v_m = \left(\frac{-1}{\varphi_{i,min}^v}(\varphi_{i,min}^p)^T\right) d_m^T + \frac{1}{\varphi_{i,min}^v}(\varphi_{i,min})^T c_i. \qquad (1.10)$$

wherein $$a_i^T = \frac{-1}{\varphi_{i,min}^v}(\varphi_{i,min}^p)^T \qquad (1.11)$$

based on the formula (1.9), the formula (1.10) and the formula (1.11), deriving that:

$$\frac{\partial f(d_m)}{\partial t} = \sum_{i=1}^{R_m} h_{i,m} a_i^T \qquad (1.12)$$

based on the formula (1.5), the formula (1.9), the formula (1.10) and the formula (1.12), deriving that:

$$R_m = \left\| \sum_{i=1}^{R_m} h_{i,m} \frac{-1}{\varphi_{i,min}^v}(\varphi_{i,min}^p)^T \right\|_2 \qquad (1.13)$$

wherein $R_m$ first centroids represent $R_m$ sets, and $N_z = \{1, 2, \ldots, R_m\}$.

18. The adaptive control system based on train operating condition identification according to claim 17, wherein the identifying a train current adhesion condition grade $N_d$ based on a number $N_z$ of train adhesion condition grades and current operating state data comprises:

determining a current traction condition, a current adhesion condition characteristic related data set and a current speed measurement deviation data set $E_{r,j}'$ based on the current operating state data;

judging a current adhesion condition grade $N_d$ based on the determined current traction condition, current adhesion condition characteristic related data set, current speed measurement deviation data set $E_{r,j}'$ and the number of train adhesion condition grades $N_z$ by adopting a data characteristic principal component analysis method, wherein $$N_d \in N_z,$$

specifically comprising:

step S101: standardizing current adhesion condition characteristic related data set $D(t)$ to obtain a standardized matrix $D_s(t)$;

step S102: solving a covariance matrix T of the standardized matrix $D_g(t)$;

step S103: performing eigenvalue decomposition on the covariance matrix to obtain an eigenvalue and a corresponding eigenvector, wherein the eigenvalue represents a variance of a current adhesion condition characteristic at each adhesion condition grade in $N_z$, and the eigenvector represents a weight of a corresponding characteristic direction;

step S104: sorting the eigenvalues in a descending order, and selecting an adhesion characteristic corresponding to a maximum eigenvalue k as a principal component; and step S105: comprehensively evaluating the principal component determined in step S104, and comparing an evaluation result with the centroid in each set of $N_z$ grades, if the evaluation result is closest to an evaluation index of one of the centroids, the train adhesion condition grade corresponding to the centroid being the train current adhesion condition grade $N_d$.

19. The adaptive control system based on train operating condition identification according to claim 18, wherein the inputting the train current adhesion condition grade $N_d$ and establishing a mapping relationship between an adhesion coefficient and a maximum deceleration for train braking under the current adhesion condition grade comprises:
   determining the adhesion coefficient under the current train adhesion condition grade $N_d$;

$$\mu_{s,1}=\Phi(N_d) \qquad (2\text{-}1)$$

wherein $\mu_{s,1}$ is the adhesion coefficient under the current adhesion condition grade; $N_d$ is the current adhesion condition grade, wherein $$N_d \in N_z; \qquad \qquad 20$$

sorting the adhesion condition grades according to adhesion state from bad to good, wherein a mapping function $\varphi$ between the current adhesion condition grade and the adhesion coefficient satisfies:

$$\Phi(N_d) = \frac{N_d - C}{|N_Z|}\alpha \qquad (2\text{-}2)$$

wherein $\alpha$ represents a safety reduction coefficient, and C represents an equal ratio reduction coefficient for the calculation of the adhesion grade;
calculating an adhesion coefficient under a current train operating state:

$$\mu_{s,2} = \frac{F}{1000Mg} \qquad (2\text{-}3)$$

wherein $\mu_{s,2}$ is a calculated value of the adhesion coefficient, and F is a traction or braking force of the train; M is a mass of a seating capacity for the train, and g is a gravitational acceleration; and
correcting the adhesion coefficient under the current train adhesion condition grade $N_d$ based on the adhesion coefficient under the current train operating state, wherein the adhesion coefficient under the current train adhesion condition grade $N_d$ satisfies:

$$\mu_s=\min(\mu_{s,1},\mu_{s,2}) \qquad (2\text{-}4)$$

the mapping relationship between the adhesion coefficient and the maximum deceleration for train braking under the current train adhesion condition grade $N_d$ satisfies:

$$\alpha_\mu=\mu_s g \qquad (2\text{-}5)$$

wherein $\alpha_\mu$ is the maximum deceleration for train braking, and g is the gravitational acceleration.

20. The adaptive control system based on train operating condition identification according to claim 19, wherein the generating a train protection curve based on the mapping relationship between the adhesion coefficient and the maximum deceleration for train braking under the current adhesion condition grade comprises:

determining train stop information based on mobile authorization information, wherein the train stop information comprises a target position $s_{end}$ and a target speed $v_{end}$, and $v_{end}=0$;
dividing the train operating speeds into a plurality of speed sections;
acquiring real-time train information, wherein the real-time train information comprises a train head position $s_{start}$, a train speed $v_0$, a train mass M and a train emergency braking characteristic curve $Q_E$;
calculating a corresponding protection curve in each speed section sequentially according to an opposite direction of a train operating direction by taking the target position as a starting point, comprising:
step S201: initializing the speed section of which the protection curve is to be calculated, and recording as an i-th speed section, letting a final speed and an end position of the i-th speed section be $v_{end,i}=v_{end}$ and $s_{end,i}=s_{end}$ respectively;
step S202: reading an initial speed $v_{start,i}$ of the i-th speed section; and
step S203: acquiring a train operating deceleration of the train in the i-th speed section, and generating an operating length of the i-th speed section based on the initial speeds $v_{start,i}$, $v_{end,i}$ and the train operating deceleration, comprising:
reading a train braking deceleration $\alpha_{1,i}$ corresponding to the i-th speed section according to the train emergency braking characteristic curve $Q_E$;
correcting the train braking deceleration based on the maximum deceleration $\alpha_\mu$ for train braking under the train current adhesion condition grade $N_d$ to generate the train operating deceleration $\alpha_{2,i}$ of the i-th speed section:

$$\alpha_{2,i}=\min(\alpha_{1,i},\lambda_\mu) \qquad (2\text{-}6)$$

generating the operating length of the i-th speed section based on the initial speeds $v_{start,i}$, $v_{end,i}$ and the train operating deceleration:

$$s_{i,1} = \frac{v_{start,i}^2 - v_{end,i}^2}{A_1 a_{2,i}} \qquad (2\text{-}7)$$

wherein $A_1$ is a first conversion unit coefficient;
step S204: acquiring a comprehensive deceleration of the i-th speed section under a gradient with a most unfavorable condition, comprising:
selecting a maximum downhill from a position obtained after $s_{end,i}$ is subtracted from $s_{i,1}$ to a position $s_{end,i}$ and recording as a gradient value $w_i$, wherein when there is no downhill, the gradient value is recorded as $w_i=0$;
correcting the train operating deceleration $\alpha_{2,i}$ to acquire the comprehensive deceleration of the i-th speed section:

$$a_i = a_{2,i} - \frac{w_i}{A_2} \qquad (2\text{-}8)$$

wherein $A_2$ is a second conversion unit coefficient;
step S205: recalculating the operating length of the i-th speed section and an entrance position of the i-th speed section and generating the protection curve in the i-th speed section based on the comprehensive deceleration, comprising:

the length of the i-th speed section satisfying:

$$s_i = \frac{v_{start,i}^2 - v_{end,i}^2}{A_1 a_i} \quad (2\text{-}9)$$

the entrance position of the i-th speed section satisfying:

$$s_{start,i} = s_{end,i} - s_i \quad (2\text{-}10)$$

the protection curve in the i-th speed section being:

$$v(x) = \sqrt{v_{start,i}^2 - A_1 a_i x} \quad (2\text{-}11)$$

wherein x is a length of a distance $s_{start,i}$, $s_{start,i} \leq x \leq s_i$, $v_{start,i}$ is an initial speed of the i-th speed section, and $\alpha_i$ is the comprehensive deceleration of the-th speed section; and step S206: judging whether the entrance position of the i-th speed section exceeds a train start position $s_{start}$, if the entrance position of the i-th speed section exceeds the train start position, taking a train speed $v_0$ as an upper speed limit of the i-th speed section, and re-executing steps S203-S205; if the entrance position of the i-th speed section does not exceed the train start position, judging whether the i-th speed section is a last speed section, if so, ending the algorithm, and taking a current speed limit as the protection curve from the train start position $s_{start}$ to the entrance position $s_{start,i}$ of the i-th speed section; and if not, starting to calculate a next speed section, letting i=i+1, $v_{end,i} = v_{start,i-1}$, $s_{end,i} = s_{start,i-1}$, and re-executing steps S202-S205; and outputting a train protection curve based on the protection curve of each speed section.

* * * * *